United States Patent [19]
Boberg et al.

[11] Patent Number: 5,402,859
[45] Date of Patent: Apr. 4, 1995

[54] PARTIALLY SPRUNG DIFFERENTIAL SYSTEM FOR A DRIVING AXLE INDEPENDENT OR DEDION SUSPENSION SYSTEM

[75] Inventors: Evan S. Boberg, Hazel Park; Gerald P. Hentschel, St. Clair Shores, both of Mich.

[73] Assignee: Chrysler Corporation, Highland Park, Mich.

[21] Appl. No.: 45,349

[22] Filed: Apr. 12, 1993

[51] Int. Cl.⁶ ............................................. B60K 17/00
[52] U.S. Cl. ................................... 180/360; 180/359; 180/378
[58] Field of Search ............... 180/378, 359, 360, 377, 180/353, 354

[56] References Cited

U.S. PATENT DOCUMENTS

| | | | |
|---|---|---|---|
| 562,289 | 6/1896 | DeDion et al. | 180/353 |
| 2,833,366 | 5/1958 | Olley | 180/359 |
| 2,968,358 | 1/1961 | De Lorean | 180/73 |
| 3,193,042 | 7/1965 | Brewer | 180/359 |
| 3,204,717 | 9/1965 | Collins | 180/42 |
| 3,209,852 | 10/1965 | Kozicki | 180/73 |
| 3,557,896 | 1/1971 | Mueller | 180/360 |
| 4,596,299 | 6/1986 | Krude | 180/73.2 |
| 4,669,571 | 6/1987 | Krude | 180/73.3 |
| 4,867,260 | 9/1989 | Cameron et al. | 180/360 |

FOREIGN PATENT DOCUMENTS

| | | | |
|---|---|---|---|
| 634338 | 2/1928 | France | 180/377 |
| 1050240 | 1/1954 | France | 180/360 |

*Primary Examiner*—Eric D. Culbreth
*Attorney, Agent, or Firm*—Edward P. Barthel

[57] ABSTRACT

A partially sprung differential gear system for a driving axle independent or deDion suspension system which embodies the mounting of the differential gear system to the suspension system such that the differential gear unit thereof travels in a ratio proportional to the wheel travel. The arrangement provides increased ground clearance and wheel travel for the driving axle independent suspension system.

20 Claims, 6 Drawing Sheets

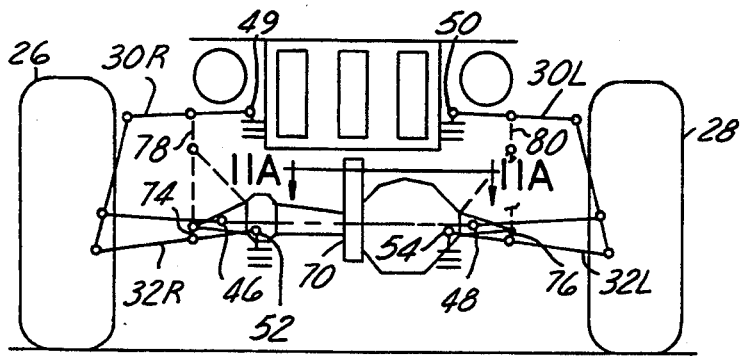
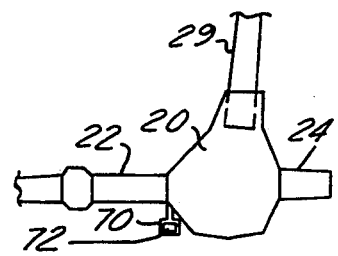
FIG.11     FIG.11A
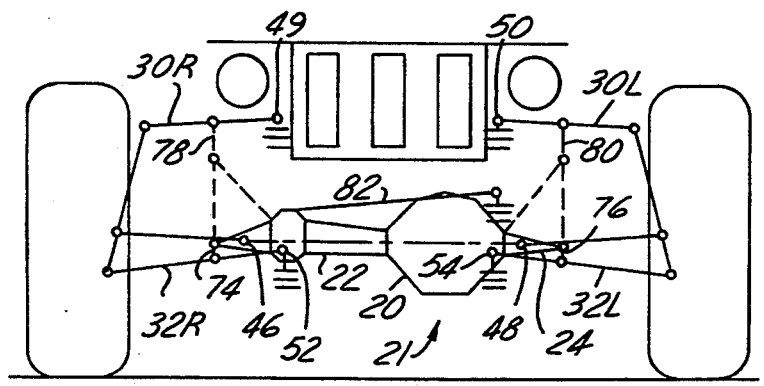
FIG.12
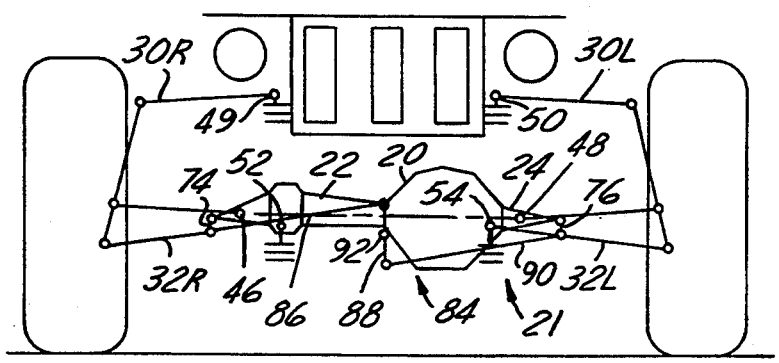
FIG.13
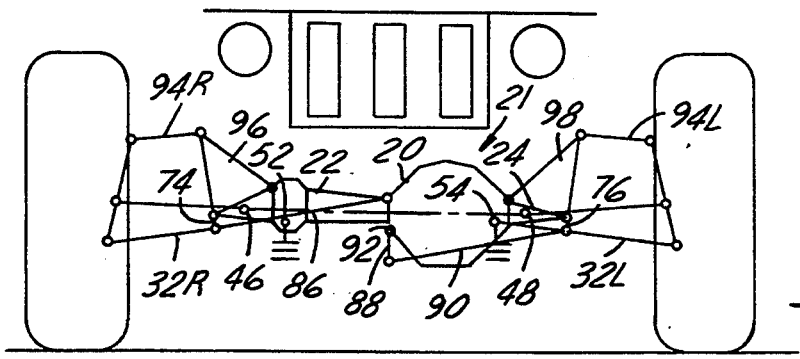
FIG.14

PARTIALLY SPRUNG DIFFERENTIAL SYSTEM FOR A DRIVING AXLE INDEPENDENT OR DEDION SUSPENSION SYSTEM

FIELD OF THE INVENTION

This invention relates generally to support structures for a vehicle differential gear unit and assembly and, more particularly, to driving axle independent or de-Dion suspension systems with a partially sprung differential assembly. This invention can be applied as an improvement to all current independent driving axle suspensions (short-long arm double wishbone, McPherson strut, twin I beam), and also to a deDion beam axle suspension system.

BACKGROUND ART

Heretofore, driving axle independent suspensions have had differential gear units mounted to the frame or body structure or to the engine and transmission, such that they do not travel in relation to the wheel travel, or the axle is integral with one of the control arms. On the deDion suspension system, the axle is mounted to the frame or body structure of the vehicle.

Off-road vehicles, military vehicles, high performance off-road and racing vehicles have typically included driving axle suspensions which have limited wheel travel due to axle halfshaft angle limitations.

Swing axles and half shafts are disclosed in the following patents: DeLorean 2,968,358; Collins 3,204,717; Kozicki 3,209,852; Krude 4,596,299; and Krude 4,669,571, but none address partially mounting the differential gear units to the suspension system.

DISCLOSURE OF THE INVENTION

A general object of the invention is to provide an improved independent vehicle suspension system.

A general object of the invention is to provide means for improved performance for a driving axle type independent or deDion suspension system.

Another object of the invention is to provide a suspension system which accomplishes substantial increases in wheel travel with no increase in axle halfshaft angles over a typical driving axle type independent suspension system.

Still another object of the invention is to provide increased ground clearance for a driving axle type independent suspension system.

A further object of the invention is to provide a driving axle independent or deDion suspension system for use as either a front or a rear suspension.

Still another object of the invention is to provide an unequal shaft length, driving axle type independent suspension system, with the intermediate differential gear unit and driving axles mounted in such a manner that the differential gear unit travels in a ratio proportional to the wheel travel.

A still further object of the invention is to provide a semi-sprung driving axle independent suspension arrangement including control arms, with right and left axle tubes of different or equal lengths, and right and left half shafts, such that the differential gear unit is positioned either off or on center, and the axles are pivotally secured to selected intermediate points on the respective right and left control arms.

A still further object of the invention is to provide a semi-sprung driving axle independent suspension arrangement including right and left axle tubes of different lengths, right and left half shafts, and right and left upper and lower control arms, wherein the axles are variously pivotally connected to the upper and/or lower control arms.

These and other object and advantages will become more apparent when reference is made to the following drawings and the accompanying description.

BRIEF DESCRIPTION OF THE DRAWINGS

FIG. 1A is an enlarged end view of an element of the FIG. 1 structure;

FIGS. 7-17 are front schematic views of alternate embodiments of the FIG. 1 structure, with FIG. 11A being a top view of the FIG. 11 structure.

BEST MODE OF CARRYING OUT THE INVENTION

Figure 1:
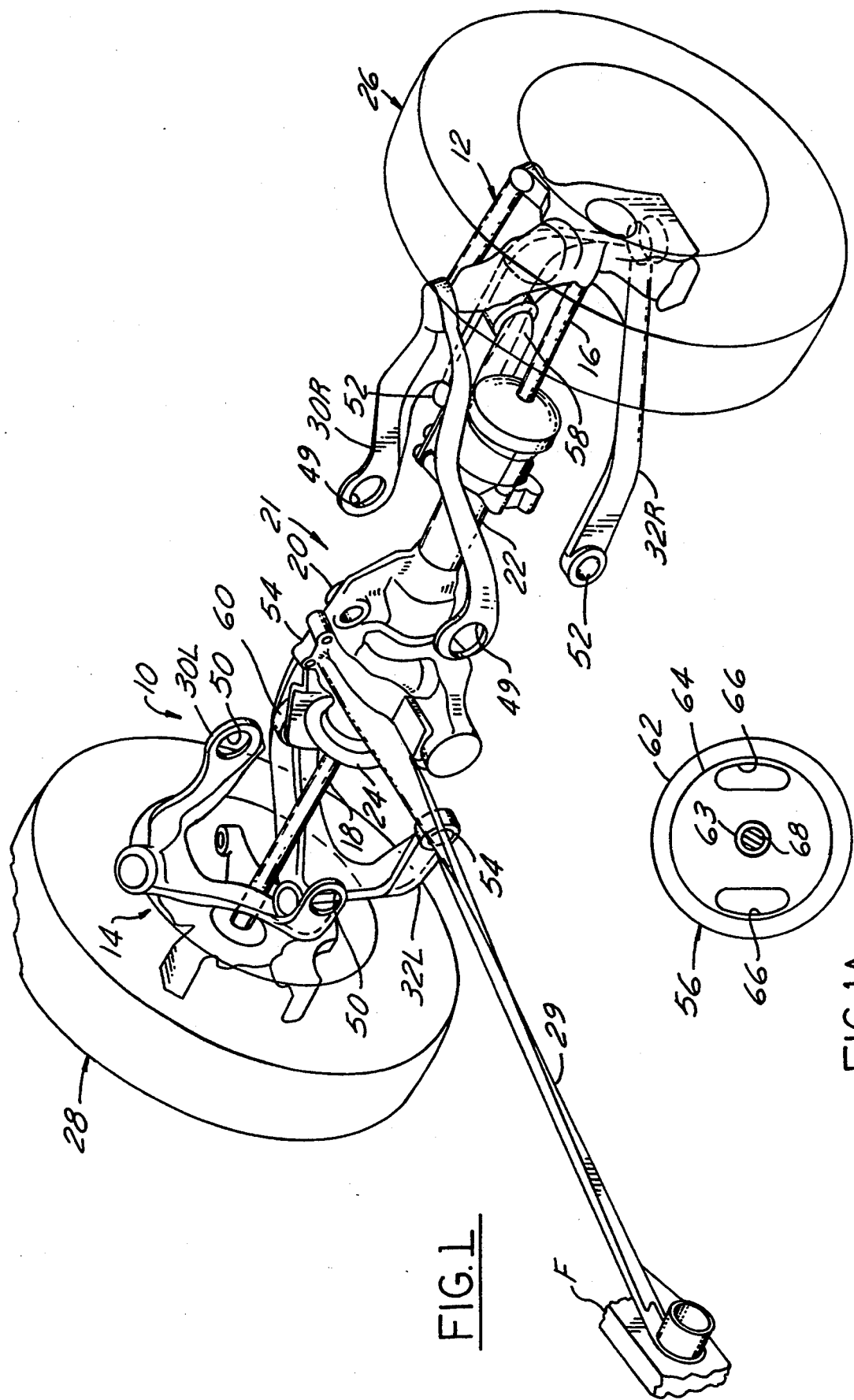
FIG. 1 is a perspective view of a semi-sprung driving axle arrangement embodying the invention.
Figure 2:
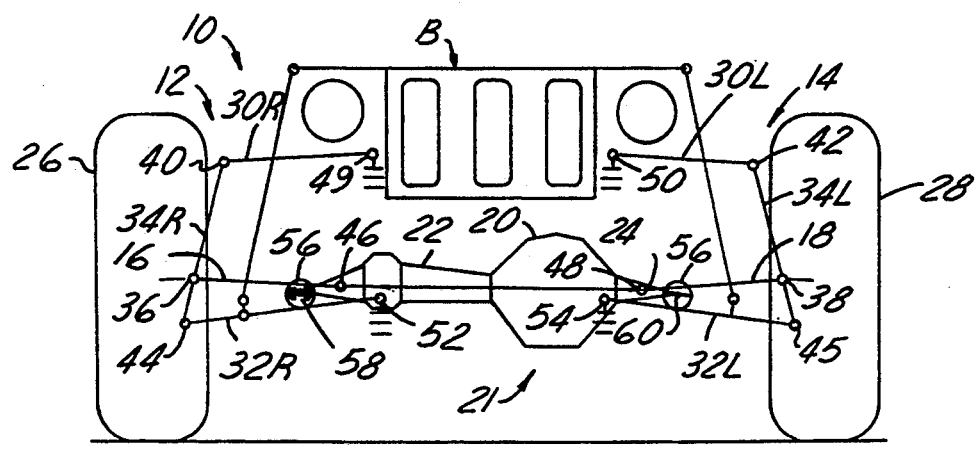
FIG. 2 is a schematic view of the FIG. 1 structure in its still or curb condition.

Referring now to the drawings in greater detail, FIG. 1 illustrates a semi-sprung driving axle arrangement 10 for a vehicle body, represented as B in FIG. 2. In FIG. 1, the arrangement 10 includes right and left suspension systems 12 and 14, respectively, right and left axles 16 and 18, and a differential assembly 21. The latter assembly 21 includes right and left axle tubes 22 and 24, respectively, with an intermediate differential gear unit 20. The respective right and left half shafts 16 and 18 extend between the right and left axle tubes 22 and 24, and respective right and left wheel assemblies 26 and 28. The right axle tube 22 is longer than the left axle tube 24 causing the differential gear unit to be positioned off-center. A torque arm 29 is fixedly secured at its forward end to the differential gear unit 20, and pivotally connected at its rear end to the left frame side rail, represented as F.

The suspension systems 12 and 14 include upper wishbone type control arms 30R and 30L, respectively, and lower wishbone type control arms 32R and 32L, respectively.

More specifically, as shown in FIG. 2, there are universal joint connections 36 and 38 between the respective shafts 16 and 18 and the junctures of the respective wheel assemblies 26 and 28; pivotable connections 40 and 42 between the upper ends of the wheel assemblies 26 and 28 and the centers of the respective upper control arms 30R and 30L; and pivotable connections 44 and 45 between the lower ends of the wheel assemblies 26 and 28 and the centers of the respective lower control arms 32R and 32L.

The inner ends 46 and 48 of the half shafts 16 and 18 are universal joints connected to selected points on the respective axle tubes 22 and 24.

The distal ends 49 and 50 of the respective upper control arms 30R and 30L are pivotally connected to suitable locations on the body B. The distal ends 52 and 54 of the respective lower control arms 32R and 32L are also pivotally connected to suitable locations on the body B.

Voided rubber bushings 56 are used to pivotally mount the outer ends of the right and left axle tubes 22 and 24 to respective pivot points 58 and 60 at selected points along the front portions of the lower control arms 32R and 32L. The voids are selected to provide a low lateral load deflection rate to allow for lateral displacement as the suspension moves through wheel travel, and to provide a high vertical load deflection rate to control the vertical location of the differential assembly. A third mounting point at the distal end of a rearwardly extending arm 29 uses a standard bushing to allow pivoting on three axes to secure the arm to the frame (not shown). The bushing 56 may comprise outer and inner metal cylindrical tubes 62 and 63 confining an elastomeric bushing 64 therebetween, with selectively located longitudinal openings 66 formed through the latter. A through-bolt 68 serves as the fastener. The elastomeric material may be varied in durometer, damping properties, and size, and variably voided by the openings 66, as requires for proper tuning of the vertical and longitudinal load deflection rates of the mount, as well as the lateral load deflection rate of the mount.

The location selected along the lower control arms 32R and 32L for the respective pivot points 58 and 60 for the mounting of the voided rubber bushings 56 is determinative of the proportion of the amount of wheel assembly 26 and 28 movement that the differential assembly 21 is caused to move. As an example, assume pivot point 58 and 60 locations which produce a differential assembly 21 movement of 40 percent of the wheel assembly 26 and 28 movements.

All of the elements of FIG. 1 are illustrated schematically in FIG. 2 in their curb positions. As such, for a particular vehicle model, there is an 8 inch ground clearance beneath the differential gear unit 20, and a 3 inch upper body clearance above the unit 20.

Figure 3:
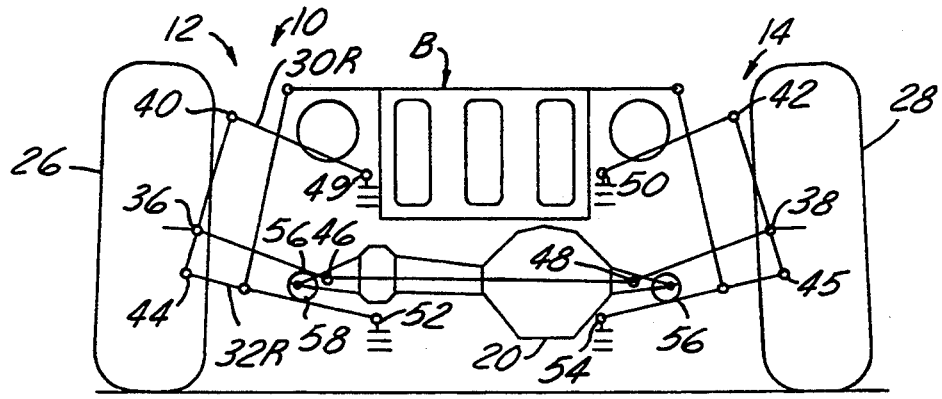
FIGS. 3-6 are front schematic views of the FIG. 1 structure in various operational conditions.

As such, FIG. 3 schematically illustrates a 6 inch jounce condition for both wheels. The resultant ground clearance is 4½ inches, and the body clearance is ½ inch.

Figure 4:
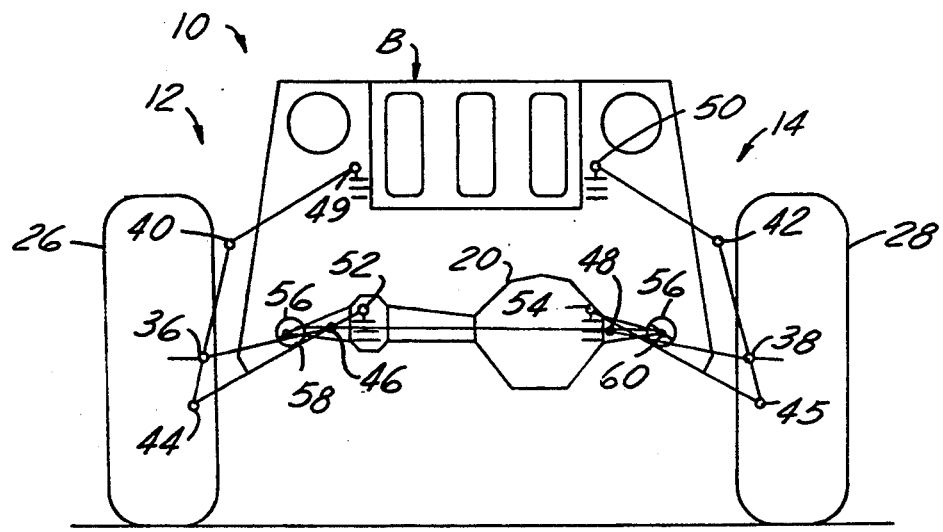

For the assumed 40% relative movement condition, FIG. 4 illustrates the 6 inch rebound condition for both wheels, resulting in an 11½ inch ground clearance, and a 5½ inch body clearance.

Figure 5:
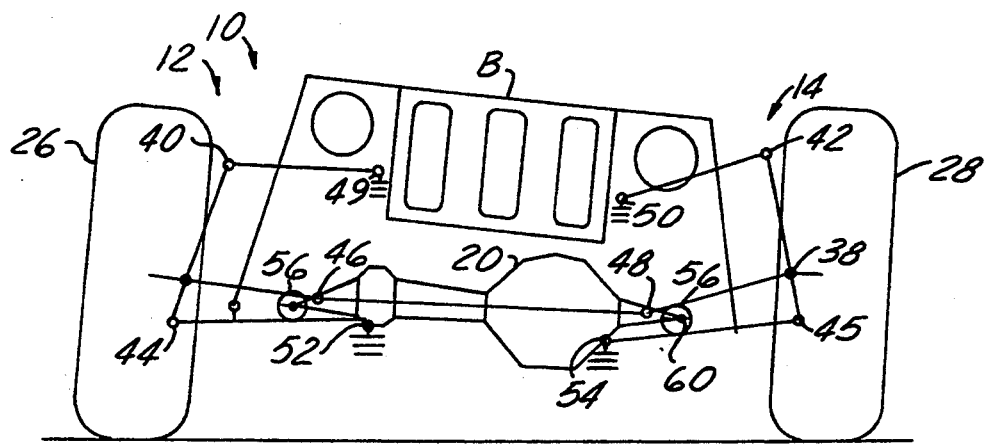

In FIG. 5 there is illustrated a 6 inch left side only jounce, which produces a 6 inch ground clearance and a 1¼ inch body clearance.

Figure 6:
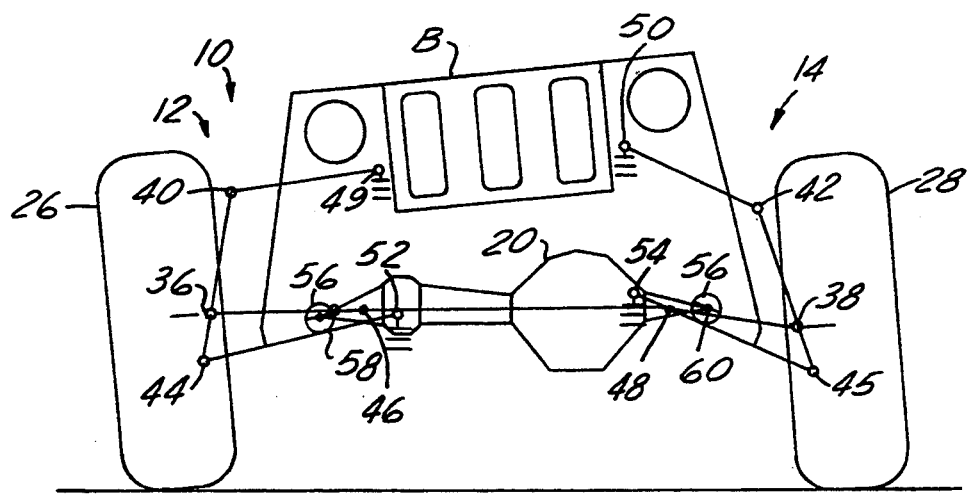

FIG. 6 illustrates a 6 inch left side only rebound, producing a 10 inch ground clearance and a 4½ inch body clearance.

As previously indicated, the above example results differ substantially from the results of the known independent suspensions wherein the differential assembly does not travel in relation to the wheel travel, or wherein the differential assembly is integral with one of the control arms.

Figure 7:
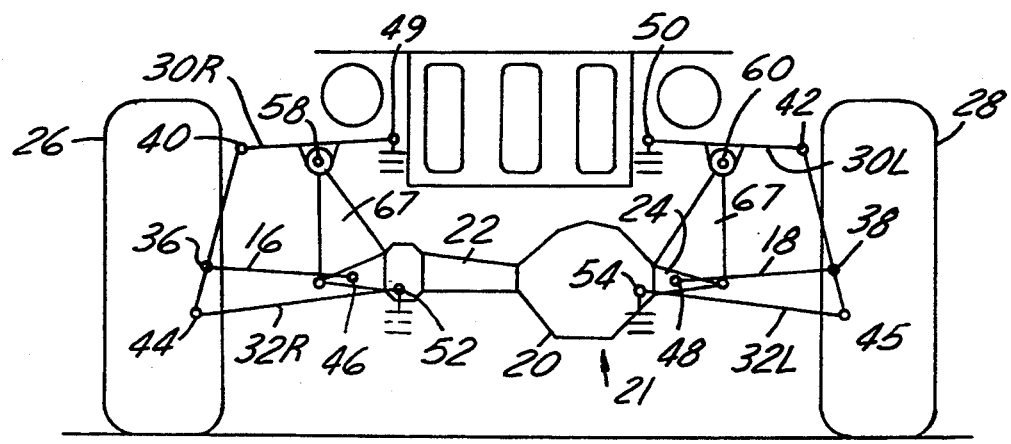

While lower control arms and frame pivot point connections have been shown and described, the above results would be possible with alternate pivot point connections. For example, as shown in FIG. 7, the pivot points 58 and 60 could be provided on oppositely disposed upper control arms 30R and 30L, via connectors 67 fixed on the axle tubes 22 and 24, with the third pivot point located along the frame F, such that the length of the torque arm 29 from the differential gear unit 20 to the frame F is approximately equal to the straight line distance between the pivot points 58 and 60.

It is to be understood that for each of the front view FIGS. 2-7 and 10-17 the torque arm 29 is as shown in the FIG. 1 perspective view, and as explained above.

Figure 8:
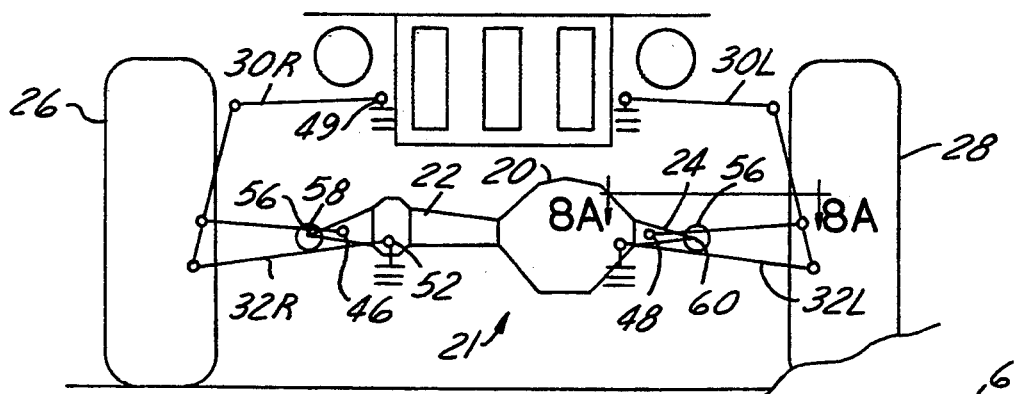
Figure 8A:
FIG. 8A is a view taken along the plane of the line 8A—8A of FIG. 8, and looking in the direction of the arrows.

In another alternate arrangement, represented in FIGS. 8 and 8A, two pivot points 60 and 61 are provided on opposite legs on one control arm, either lower or upper (lower is illustrated), and the third pivot point on the oppositely disposed control arm (or two pivots on the oppositely disposed control arm), with bushings 56 that provide for lateral displacement.

Figure 9:
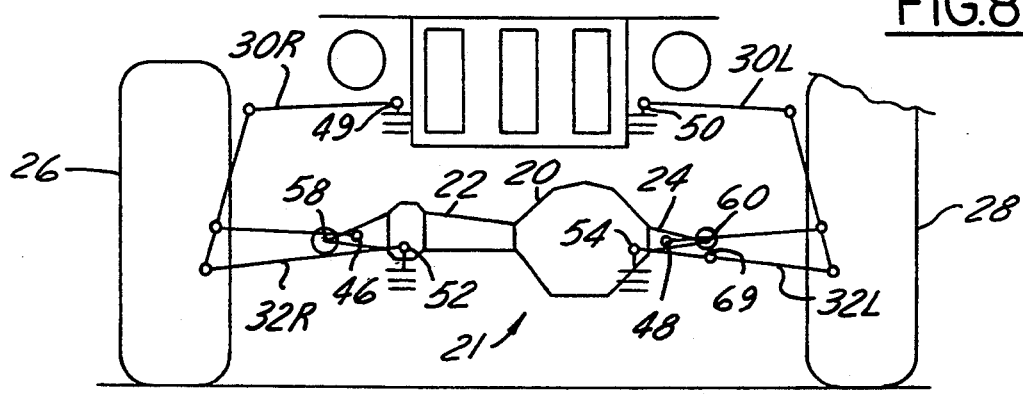

In a further alternate arrangement shown in FIG. 9, two pivot points are provided on one control arm, either upper or lower, as shown and described for the FIGS. 8 and 8A embodiment, and a pivotally mounted shackle 69 on the opposite control arm to the differential assembly, or two shackles on the opposite control arm to the differential assembly.

Figure 10:
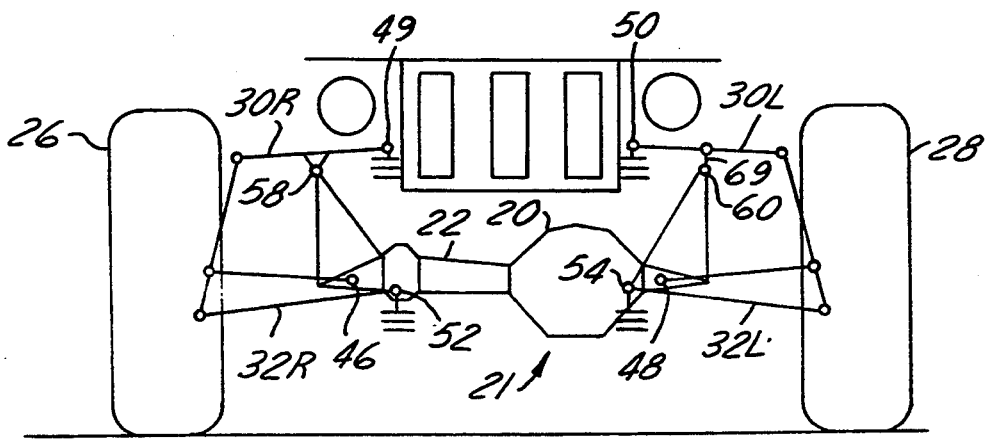

In still another alternate arrangement, represented in FIG. 10 one pivot point is provided on one control arm, either upper or lower (upper is shown), a shackle 69 on the opposite control arm, and the torque arm 29 extending to a third mounting point located rigidly on the vehicle frame in lieu of the second pivot point on the one control arm of FIG. 9.

A still further alternate arrangement represented in FIG. 11, includes a vertical track 70 including a bearing 72 (FIG. 11A) to control the axle laterally, and links 74 and 76 to each of the lower control arms (or links 78 and 80, shown in phantom, to each of the upper control arms) to control the vertical displacement of the axle. Axle wind-up control is accomplished by the torque arm 29 from the differential assembly 21 to the frame F.

As represented in FIG. 12, still another alternate arrangement includes using a panhard rod 82 from the axle tube 22 to the frame F, in lieu of the vertical track 70 of FIG. 11, to control lateral displacement of the differential assembly, and links 74/76, 78/80 to respective control arms to control vertical displacement.

A still further alternate arrangement, illustrated in FIG. 13, includes using a Watts linkage 84 to control lateral displacement of the differential assembly, and links 74 and 76 from the axle tubes 22 and 24 to the control arms to control vertical motion. The Watts linkage includes first, second and third links 86, 88 and 90, pivotally connected in series between the lower control arms 32R and 32L at the respective pivot points with the links 74 and 76, with a central point of the intermediate link 88 being pivotally connected at a pivot point 92 to the differential assembly 21.

In FIG. 14, instead of upper control arms 30R and 30L being connected at their distal ends to the frame F, as in FIG. 13, shorter control arms 94R and 94L are attached by suitable pivotal connectors 96 and 98 to the respective axle tubes 22 and 24. Otherwise, this embodiment is the same as FIG. 13.

Figure 15:
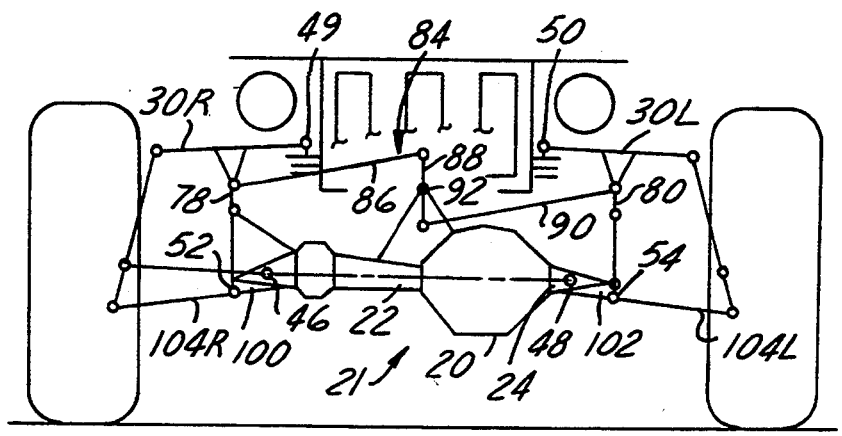

In FIG. 15, the Watts linkage 84 extends between the upper control arms 30R and 40L, at the pivot points of the links 78 and 80, and shorter lower control arms 104R and 104L are connected by suitable pivotal connectors 100 and 102 to the respective axle tubes 22 and 24, instead of to the frame F, as shown in FIG. 11.

Figure 16:
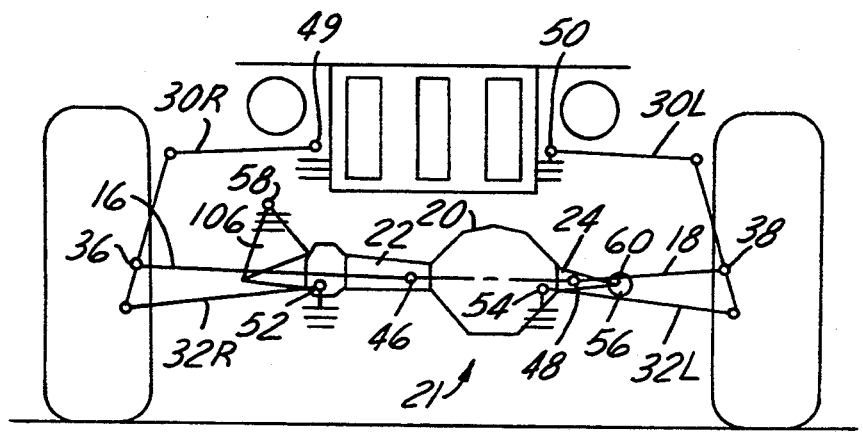

In FIG. 16, the differential assembly 21 is mounted to the left lower control arm 32L and pivotally connected by a connector 106 to the frame at pivot point 58, and the torque arm 29 is as used in FIG. 1, or two pivot points at 58 can be used in lieu of the torque arm 29. In this arrangement the pivotal connection of the short shaft 16 to the axle tube 22 is made at the inner end 46 which has been moved toward the left of the vehicle in this illustration. The voided bushing 56 mounting arrangement shown may be replaced by the shackle 69 shown in FIG. 9.

Figure 17:
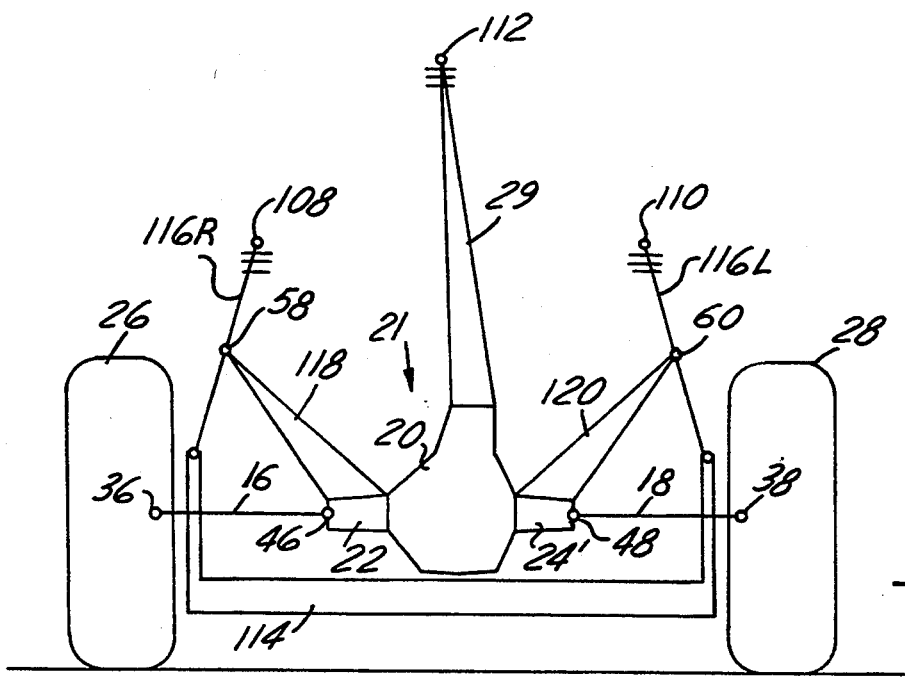

In a further application on a deDion suspension system shown in FIG. 17, the differential gear assembly 21 is pivotally mounted at a point 112 to the frame through the torque arm 29. Connectors 118 and 120 further mount the axles to pivot points 58 and 60 on control arms 116L and 116R. In this deDion arrangement, the differential gear unit 20 is located on the center line of the vehicle due to the axle tubes 22' and 24' being the same length.

INDUSTRIAL APPLICABILITY

It should be apparent that the invention provides a variety of alternate embodiments of an improved driving axle independent suspension system for use as either a front or a rear suspension, with the intermediate differential assembly mounted to the suspension system such that the differential assembly travels in a ratio proportional to the wheel travel, providing increased ground clearance and wheel travel.

What is claimed is:

1. For use in a vehicle including a frame, right and left wheels, and a driving axle independent suspension system including right and left control arm means and right and left half shafts, a partially sprung differential system including a differential gear unit and integral right and left axle tubes pivotally connected to the inner ends of the respective right and left half shafts, characterized by the right and left axle tubes being pivotally connected to the respective right and left control arms means in a manner so as to cause the differential gear unit to travel in a ratio proportional to the wheel travel, wherein the right and left control arms means each include upper and lower control arms, wherein each of said control arms include spread-apart legs in a wishbone shape, and said right and left axle tubes are operatively pivotally connected to one of said legs of the right and left lower and upper control arms.

2. The partially sprung differential system described in claim 1, wherein the right and left axle tubes are connected to the respective right and left control arm means.

3. The partially sprung differential system described in claim 1, wherein the right and left axle tubes are connected to the respective right and left lower control arms.

4. The partially sprung differential system described in claim 1, wherein the right and left axle tubes are connected to along the respective right and left upper control arms.

5. The partially sprung differential system described in claim 1, and a torque bar connected to said frame and rigidly connected to said differential gear unit.

6. The partially sprung differential system described in claim 1, and one of said right and left axle tubes is additionally pivotally connected to the other leg of said one of the right and left lower and upper control arms.

7. The partially sprung differential system described in claim 1, and selectively voided bushings providing each pivotal connection.

8. The partially sprung differential system described in claim 1, wherein each upper and lower control arm is pivotally connected to the body.

9. The partially sprung differential system described in claim 1, and a shackle pivotally connected between one of said axle tubes and the other of said legs of the lower and upper control arms.

10. The partially sprung differential system described in claim 1, and a shackle pivotally connected between one of said axle tubes and one of the lower and upper control arms.

11. The partially sprung differential system described in claim 1, and connectors secured to said respective right and left axle tubes and to on said respective control arm means.

12. The partially sprung differential system described in claim 11, wherein said right and left axle tubes are the same length.

13. The partially sprung differential system described in claim 1, wherein the right and left axle tubes have different lengths.

14. The partially sprung differential system described in claim 13, and a link pivotally connected between each axle tube and a control arm in each of the left and right control arm means for controlling vertical displacement of the axle tubes, and a vertical track secured at one end thereof to said frame and slidably connected to the longer of said right and left axle tubes to position same laterally.

15. The partially sprung differential system described in claim 13, and a link pivotally connected between each axle tube and a control arm in each of the left and right control arm means for controlling vertical displacement of the axle tubes, and a panhard rod secured at one end thereof to said frame and pivotally connected to the longer of said right and left axle tubes to position same laterally.

16. The partially sprung differential system described in claim 13, and a link pivotally connected between each axle tube and a control arm in each of the left and right control arm means, and a Watts linkage operatively pivotally connected among said control arm means and the longer of said right and left axle tubes.

17. The partially sprung differential system described in claim 16, wherein said Watts linkage includes a first linkage member pivotally connected at a mid-length point thereof to said longer axle tube, a second linkage member pivotally connected between one end of said first linkage member and a pivot point of one of the upper and lower control arms of each control arm means, and a third linkage member pivotally connected between the other end of said first linkage member and a pivot point of the other of said upper and lower control arms.

18. The partially sprung differential system described in claim 16, wherein said links are pivotally connected between each axle tube and each respective lower control arm, said Watts linkage is operatively pivotally connected between the lower control arms, and said upper control arms are substantially shorter than the lower control arms and pivotally connected at ends by connector members fixed on said respective right and left axle tubes.

19. The partially sprung differential system described in claim 16, wherein said links are pivotally connected between each axle tube and each respective upper control arm, said Watts linkage is operatively pivotally connected between the upper control arms, and lower control arms are pivotally connected at ends by connector members fixed on said respective right and left axle tubes.

20. The partially sprung differential system described in claim 13, and a connector secured to the longer axle tube and pivotally connected to the frame.

* * * * *